Aug. 9, 1938.　　　A. H. SCHMIDTKE　　　2,126,582
BASKET COVER FASTENER
Filed Jan. 2, 1934

Inventor:
Albert H. Schmidtke
By Eugene M. Giles
Atty.

Patented Aug. 9, 1938

2,126,582

UNITED STATES PATENT OFFICE 2,126,582

BASKET COVER FASTENER

Albert H. Schmidtke, St. Joseph, Mich., assignor to St. Joseph Iron Works, St. Joseph, Mich., a corporation of Michigan Application January 2, 1934, Serial No. 704,951

5 Claims. (Cl. 217—124)

My invention relates to basket cover fasteners wherein the basket and cover have members which interlock for fastening the cover in place on the basket.

While my invention is not necessarily limited thereto, it is particularly adapted for use in connection with covers of the type commonly used with bushel baskets wherein the cover consists of thin strips or panels secured at their outer ends to the upper edge of a hoop. Such baskets are usually made with a pair of wire handles projecting upwardly above the upper edge of the basket at opposite sides and the cover, which is of suitable size so that the depending marginal hoop thereof is located directly above the rim of the basket, has a top cross slat with projecting ends which are engaged in the basket handles for holding the cover in place on the basket. It is the prevailing practice, however, to fill such baskets heaping full so as to produce what is known as a bulge pack and when the cover is forced down over the basket contents and the projecting ends of the top cover slat are engaged with the basket handles, the cover is placed under considerable strain and bulges upwardly so that there is a considerable gap between the cover and basket midway around the sides thereof between the basket handles, and this is quite objectionable not only from the standpoint of appearance, but also because it exposes or permits access to the contents of the basket and oftentimes occasions considerable loss. It is desirable, therefore, and quite important to provide means for fastening the cover down to the basket at these points midway around the basket between the basket handles and such midway fastening means not only must be very strong and secure so as to safely withstand the bulging strain on the cover as well as the rough handling to which such baskets are subjected in shipping, but they must be small and compact, inexpensive and such that they can not only be used readily by ordinary basket packers in fastening the cover, but also can be easily disconnected for removing the cover without, in either case, causing inconvenience, annoyance or delay, all of which presents a difficult and perplexing problem, particularly in view of the fact that such baskets and covers are made of such thin, light weight materials that ordinary modes of attachment are not acceptable as they not only do not afford sufficient strength, but also are likely to unduly weaken the parts of the basket and cover where the fastener is attached.

The principal objects of my invention are to provide an improved basket cover fastener for this purpose; to design the fastener so that it is suitable for and satisfies all the above mentioned requirements of side fasteners for such covers; to insure a strong and secure attachment of the fastener parts to the basket and cover without impairing the strength of the portions of the basket and cover to which they are attached, and in general to provide a simple, inexpensive and satisfactory basket cover fastener,—these and other objects being attained with the construction shown in the accompanying drawing in which, Fig. 1 is a perspective view of a bushel basket with cover thereon which is fastened to the basket with my improved fasteners;

Figure 1:
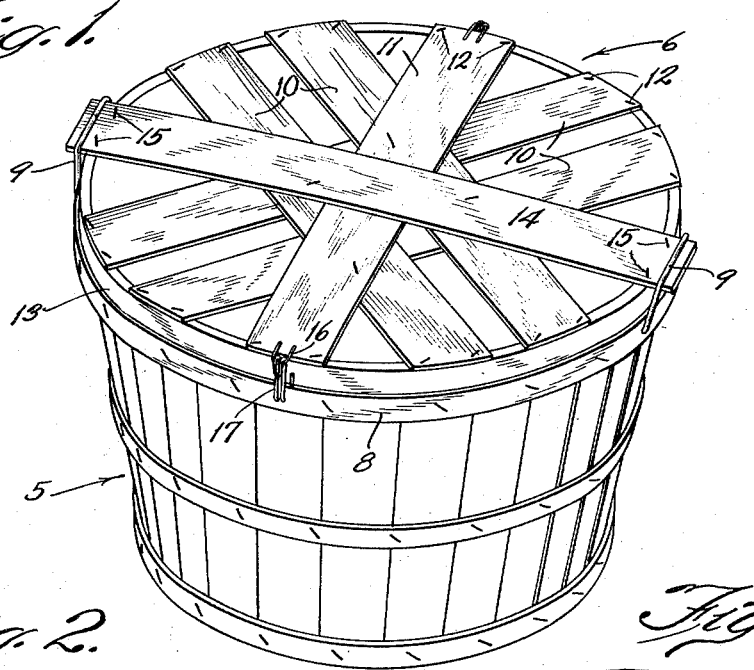

Referring to the drawing, the reference numeral 5 indicates a basket and 6 a basket cover, both of which are of usual construction,—the basket having the upper edge of the side wall secured between inner and outer top hoops 7 and 8 respectively, to which wire handles 9 are attached, and the cover consisting of a plurality of thin crossed slats 10 and 11, which are secured at their ends by staples 12 to the top edge of the marginal hoop 13, and said cover also has a top slat 14 which is likewise secured to the top edge of the hoop 13 by staples 15 and has projecting ends which engage the basket handles 9 for fastening the cover on the basket.

Figure 2:
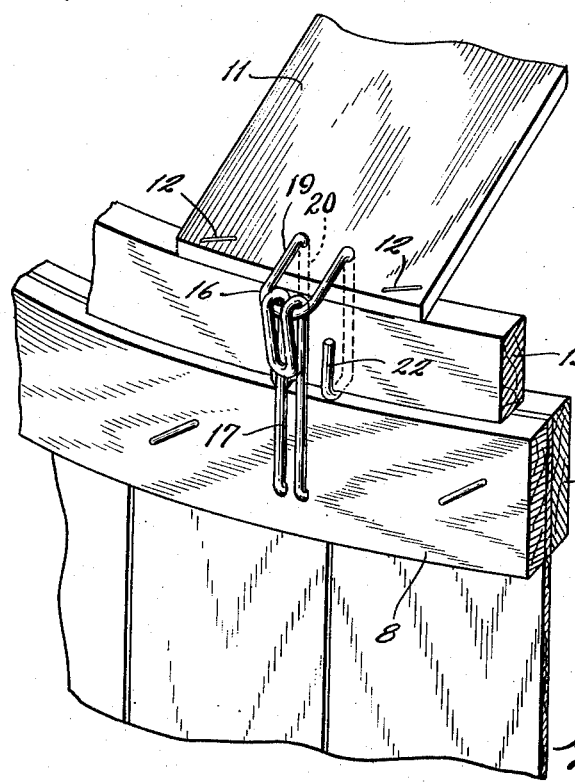
Fig. 2 is an enlarged view of the front fastener of Fig. 1 with fragmentary portions of the basket and cover to which it is attached.
Figure 3:
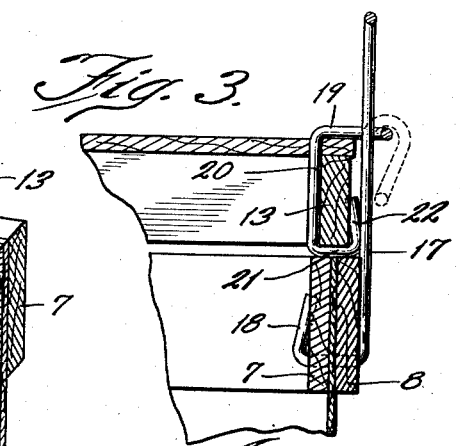
Fig. 3 is a vertical sectional view through the middle of the fastener and the edge of the cover and rim of the basket, the tongue member of the fastener being shown in full lines in the inserted position and in dotted lines in the downturned locking position.

For securing the basket cover at the sides, or at points therearound midway between the handle 9 and slat 14 connections, the cover is provided with projecting wire loops 16 and the basket with tongue members 17, the latter of which originally project straight up above the top edge of the basket so that when the cover 6 is applied on the basket 5 with the cross slat 14 engaged with the handles 9, each tongue 17 projects up through the corresponding cover loop 16 as shown by full lines in Fig. 3, and by bending the top portions of the tongues 17 down as shown in Figs. 1 and 2 and as indicated by dotted lines in Fig. 3, the tongues 17 and loops 16 are interlocked so as to fasten the cover down securely to the basket at these places.

The tongue members 17 are preferably wire loops as shown having a pair of laterally spaced legs joined by a bend at the upper ends and the lower ends of the legs are punched through the top hoops 7 and 8 of the basket near to their bottom edges and through the intermediate basket wall and have the inner ends bent upwardly and clinched against the inner hoop 7 as shown at 18 so that the tongue member is securely locked in place on the basket rim and projects upwardly in position to engage with a cover loop.

The cover loops 16 are also of wire with the legs spaced apart a distance sufficiently greater than the spacing of the legs of the tongue member so as to accommodate the latter therebetween and the bend of each loop member 16 projects outwardly beyond the edge of the cover. These loop members 16 are located at opposite ends of the slat 11, and for attaching the loop members to the cover, the legs extend inwardly as indicated at 19 over the respective end of the slat 11, then downwardly as at 20 through the slat 11 and along the inner face of the cover hoop 13, then outwardly as at 21 under the lower edge of said hoop, and the ends of said legs are bent upwardly and clinched against the outer face of the hoop 13 as shown at 22. Thus the cover loops 16, by their clamping engagement with the hoop 13 and the ends of the cover slat 11, are rigidly and permanently secured to the cover in a manner that insures adequate strength, and this not only is accomplished without weakening the cover at the place of attachment, but added strength is imparted to the cover at the location of the loop member inasmuch as the attachment of the loop member reinforces the connection of the end of the slat with the hoop 13.

Figure 4:
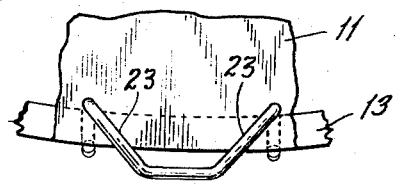
Fig. 4 is a top view of a fragmentary portion of the cover showing a modified form of the cover member of the fastener.

Instead of having the arms 19 of the cover member 16 parallel as shown in Figs. 1 and 2, it may be desirable to form said member with divergent arms as shown at 23 in Fig. 4, so that the arms extend diagonally across the grain of the cover slat 11 and a greater length of each arm 23 overlies the end of the slat, thus providing a better engagement of the cover member with the top of the slat 11 for fastening it more securely onto the hoop 13 and for preventing splitting and pulling loose of the slat 11 from the hoop 13 under the bulging strain that is imposed on the cover.

While I have shown and described my invention in a preferred form and as applied to a structure in which the cover is engaged with the basket handles, I am aware that the cover may be fastened in place entirely with fasteners of the character herein described, arranged at suitable intervals around the basket, and that various other changes and modifications may be made without departing from the principles of my invention, the scope of which is to be determined by the appended claims.

I claim as my invention:

1. The combination of a container, a cover comprising thin material secured to the upper edge of a marginal strip, and fastener members on the container and cover respectively for fastening the cover onto the container, the fastener member on the cover having inner, outer, upper and lower portions, said inner and outer portions being connected at their lower ends by said lower portion and said inner and lower portions being clamped respectively against the inner face and the lower edge of said marginal strip and said upper portion being extended outwardly from the upper end of said inner portion over the upper edge of said marginal strip and provided with a loop like portion beyond the outer face of said marginal strip and the fastener member on the container having a tongue extending upwardly along the outer face of said marginal strip and through the aforesaid loop like portion of the fastener member on the cover, thence laterally over and down the side of said loop like portion in interlocking engagement therewith.

2. The combination of a container, a cover comprising thin material secured to the upper edge of a marginal strip, and fastener members on the container and cover respectively for fastening the cover onto the container, the fastener member on the cover having inner, outer, upper and lower portions, said inner and outer portions being connected at their lower ends by said lower portion and said lower and outer portions being clamped respectively against the lower edge and the outer face of said marginal strip and said upper portion being extended outwardly from the upper end of said inner portion over the upper edge of said marginal strip and provided with a loop like portion beyond the outer face of said marginal strip and the fastener member on the container having a tongue extending upwardly along the outer face of said marginal strip and through the aforesaid loop like portion of the fastener member on the cover, thence laterally over and down the side of said loop like portion in interlocking engagement therewith.

3. The combination of a container, a cover comprising thin material secured to the upper edge of a marginal strip, and fastener members on the container and cover respectively for fastening the cover onto the container, the fastener member on the cover having inner, outer, upper and lower portions, said inner and outer portions being connected at their lower ends by said lower portion and clamped respectively against the inner and outer sides of said marginal strip and said upper portion being extended outwardly from the upper end of said inner portion over the upper edge of said marginal strip and provided with a loop like portion beyond the outer face of said marginal strip and the fastener member on the container having a tongue extending upwardly along the outer face of said marginal strip and through the aforesaid loop like portion of the fastener member on the cover, thence laterally over and down the side of said loop like portion in interlocking engagement therewith.

4. The combination of a container, a cover comprising thin material secured to the upper edge of a marginal strip, and fastener members on the container and cover respectively for fastening the cover onto the container, the fastener member on the cover having inner, outer, upper and lower portions, said inner and outer portions being connected at their lower ends by said lower portion and said inner, outer and lower portions being clamped respectively against the inner and outer sides and the lower edge of said marginal strip and said upper portion being extended outwardly from the upper end of said inner portion over the upper edge of said marginal strip and provided with a loop like portion beyond the outer face of said marginal strip and the fastener member on the container having a tongue extending upwardly along the outer face of said marginal strip and through the aforesaid loop like portion of the fastener member on the cover, thence laterally over and down the side of said loop like portion in interlocking engagement therewith.

5. The combination of a container, a cover comprising thin material secured to the upper edge of a marginal strip, and fastener members on the container and cover respectively for fastening the cover onto the container, the fastener member on the cover having inner, outer, upper and lower portions clamped respectively against the inner face of said marginal strip, the outer face of said marginal strip, the upper face of said thin material and the bottom edge of said marginal strip and said upper portion being extended outwardly from the upper end of said inner portion over the upper edge of said marginal strip and provided with a loop like portion beyond the outer face of said marginal strip and the fastener member on the container having a tongue extending upwardly along the outer face of said marginal strip and through the aforesaid loop like portion of the fastener member on the cover, thence laterally over and down the side of said loop like portion in interlocking engagement therewith.

ALBERT H. SCHMIDTKE.